Patented Aug. 20, 1940

2,211,918

UNITED STATES PATENT OFFICE 2,211,918

CALCIUM PHOSPHATE PRODUCT

John W. Turrentine, Washington, D. C.

No Drawing. Application August 15, 1938,
Serial No. 225,001

3 Claims. (Cl. 71—50)

This invention relates to the conversion of phosphate rock and similar phosphatic materials into products containing phosphorus in agriculturally available form by reaction of the phosphate rock with a volatile inorganic acid, and is particularly directed to the novel products thereby produced.

It has been found that by treating phosphate rock with a volatile inorganic acid, such as hydrochloric or nitric acid, or with a chemical equivalent of either or both of these acids such as oxides of nitrogen or nitrosyl chloride, in the presence of such an amount of water that the reaction product is a slurry predominantly in solid form, the reaction product consists substantially of a new combination of calcium, phosphate radical, and chloride or nitrate radical corresponding to the chemical formula $$CaH_4P_2O_8.CaCl_2.2H_2O$$

wherein all or a portion of the calcium chloride may be replaced by calcium nitrate. The reactions involved may be represented by the following equation representing the treatment of phosphate rock of average composition with hydrochloric acid in amount at least sufficient to convert the $P_2O_5$ content to mono-calcium phosphate:

(1) $(CaO)_{3.5}.P_2O_5 + 5HCl + 3H_2O =$
$CaH_4P_2O_8.H_2O + 2.5CaCl_2.H_2O$

It has been further found that upon heating the reaction products obtained as outlined above, hydrochloric or nitric acid or both may be liberated therefrom and recovered, producing a material having a composition corresponding to a compound of dicalcium phosphate and calcium chloride or calcium nitrate or both, depending on the original reactants, and differing substantially in its properties from a mixture of dicalcium phosphate and calcium chloride or calcium nitrate, particularly in that a substantial proportion of the phosphate content is soluble in water. Upon heating the products of Reaction 1, the following reaction takes place:

(2) $CaH_4P_2O_8 + 2.5CaCl_2 =$
$2CaHPO_4 + 1.5CaCl_2 + 2HCl$

In the foregoing equations, the nature of the combination between the calcium phosphate and the calcium chloride is not indicated.

The principles of the invention are illustrated in the following specific examples:

Example 1

To 1140 parts of ground phosphate rock of 33 per cent $P_2O_5$ content is added 495 parts of HCl as an aqueous solution of 38 per cent HCl, the two being thoroughly intermixed to yield a slurry which on denning sets up to a solid. The denned product is then heated, preferably in a closed mechanical furnace or drier, to a temperature of 150° C., the evolved HCl gas is drawn off for recovery and reuse and the heated residue is discharged as the finished product. Or, the denning operation may be omitted and the slurry charged directly into the heater, as described, to yield the same result.

Obviously, other strengths of HCl solution may be employed, 38 per cent being stipulated as yielding a slurry which on denning sets up to a solid and thereafter admits of being handled as a solid; further, the more concentrated the acid, the less is the proportionate volume of water subsequently to be evaporated.

The apparatus employed in adding acid to rock may be any appropriate mixing device but preferably is that type employed in superphosphate manufacture with sulfuric acid; that employed in heating the mixture again may be any appropriate type, vertical, sloping or horizontal, but preferably is the closed, externally fired type designed to move the charge continuously and automatically from entrance to exit and in the direction of increasing temperatures and with gas exit.

By an alternative procedure modified to avoid the intermediate condensation of HCl to aqueous solution, the gaseous HCl is applied to humidified ground phosphate rock, preferably counter-current-wise to effect absorption and interaction, the reaction product then being heated as described. The apparatus is of that type designed to bring finely comminuted solids into reaction contact with a gas. This may be so operated and more or less integrally combined with the heater as to constitute a single unit with a hot and a cold zone, in the former there being absorbed the HCl gas that has been evolved in the latter; thus, the HCl employed, in part at least, is undergoing continuous liberation and distillation from the hot zone and condensation and absorption in the cold zone (with addition of HCl gas from the original source, as described).

The phosphatic product obtained at 150° C. contains 30 per cent $P_2O_5$ and approximates in composition 58 per cent $CaHPO_4$ and 37 per cent $CaCl_2$. It is soluble in water to the extent of over 10 per cent of its $P_2O_5$ content and over 11 per cent of its Cl content, thus having a solubility greater than, and of an entirely different order from that to be expected of a mixture of dicalcium phosphate and calcium chloride. Moreover, the product is markedly less hygroscopic than a mixture of dicalcium phosphate and calcium chloride in the same ratios.

With increase in temperature the elimination of $CaCl_2$ (through conversion to the volatile HCl) continues progressively—at 150° C., 40 per cent, and at 500° C. 78 per cent of the HCl equivalent has been evolved, with the corresponding increase in the basicity of the product. At the higher temperatures, however, there is a tendency toward the formation of phosphates of decreasing availability, that tendency, apparently, being a function of the fluorine content of the conversion product, for which reason the lower temperatures are preferred as being more easily attained while affording satisfactory results.

*Example 2*

To pebble, crushed or granular phosphate rock there is applied, preferably by percolation or continuous counter-current flow, an amount of aqueous HCl solution (23 per cent HCl) in such amount as to constitute a ratio of 425 parts of rock (basis 33 per cent $P_2O_5$) to 247 parts of HCl, to yield a solution of dissolution products substantially saturated therein, from which insoluble matter is separated and to which there is then added, by counter-current absorptive flow, a quantity of gaseous HCl equivalent to 248 parts or to substantial saturation therein. The resulting solution with fortified HCl content is then applied to 715 parts of ground phosphate rock with mixing to yield a slurry which is then heated as described under (1).

While acid of 23 per cent HCl is specified as preferred since it yields a solution approaching saturation, at 25° C., in dissolution products, it is obvious that other concentrations can be employed; further, that batch, as contrasted with continuous, counter-current processing can be applied, as for example, by dissolving ground rock in the acid; that in this initial step low grade rock can be used to advantage in the place of the high grade stipulated, the ratios of acid to rock employed being adjusted appropriately; that acid absorption from the gas phase may be combined with rock dissolution by passing the gas into reactive contact with the rock in the presence of water so regulated in amount as to yield the desired product and in various other ways the procedure may be modified without exceeding the scope of this invention.

The action of nitric acid, in gaseous or aqueous solution form, is analogous to that of hydrochloric acid, although certain differences exist, particularly from an economic viewpoint. Nitric acid is more soluble in water than hydrochloric, simplifying the development of high concentration of solutions employed with decrease in water requirement. Calcium nitrate, unlike calcium chloride, has an established market value and represents a merchantable component of the product instead of a diluent. However, its decomposition in part is justified as increasing the reagent value of the acid employed and as decreasing the hygroscopicity of the product, thereby contributing enhanced stability and physical properties.

*Example 3*

Upward through a bed of phosphate particles is passed a stream of nitrogen oxides (from an ammonia burner) preferably under pressure, while downward therethrough is passed a stream of water, (or dilute solution of $HNO_3$ or solution products), so regulated in amount that upon issuance therefrom it is, preferably, substantially saturated with the reaction products. The phosphate particles undergo rapid attrition, particularly in the region of gas entrance, the bed being maintained by the addition of phosphate particles. Insoluble constituents of the rock are removed as suspended matter in the issuing solution or by other means, depending on the proportion of such and the type of containers employed. Provision is made for the oxidation of the NO constituent of the gas mixture to $NO_2$, as usual, by the adoption of multiple (3) stage application of the said gas with interposed reoxidation chambers, as desired, counter-current flow being maintained with respect to each and all stages, i. e., the dilute solution obtained in the final, is advanced progressively through the intermediate to the first stage.

This solution is then fortified, with respect to its acid content, by being applied to the absorption of or mixed with the nitric acid evolved on heating the final product and is then intermixed with the required proportions of ground phosphate rock as hereinbefore described, the proportions, the procedures and objectives being analogous to those hereinbefore illustrated with HCl application; or it may be fortified with respect to its acid content by being applied as an absorbent of nitrogen oxide gases, with or without phosphate rock being present, when so applied being a more efficient absorbent of said oxides than a water solution of nitric acid or equivalent nitrogen content.

Various modifications in procedures yield the final objectives, e. g., aqueous nitric acid may be applied directly to ground phosphate rock as illustrated under (1), or to granular phosphate rock as illustrated under (2); ground phosphate rock in water suspension may be employed as an absorbent for nitrogen oxides and the ratio of water to solid may be so adjusted as to yield a slurry of reaction products which, on denning, sets up to a solid, and the heat treatment may be so varied as to yield a final product of any desired phosphate-nitrate ratio.

The final product obtained with nitric acid is likewise differentiated from a mixture of dicalcium phosphate and calcium nitrate in corresponding proportion, by the substantially greater solubility of its $P_2O_5$ content in water and the lower hygroscopicity of the product.

When using nitrosyl chloride the method may be operated in such a way as to convert the nitrosyl chloride in one operation entirely into a mixed product containing both calcium chloride and calcium nitrate, and having an increased solubility of its $P_2O_5$ content in water comparable to that of the products obtained in the foregoing examples, particularly if a supply of oxygen is made available to the reactants. It is generally preferable, however, to effect the absorption of the nitrosyl chloride in two stages, the first giving a phosphate product containing calcium chloride and a gaseous product containing nitrogen oxides and thereafter reacting the nitrogen oxides with a further quantity of phosphate rock in the presence of oxygen or after the addition of oxygen to the gases to produce a phosphate product containing calcium nitrate.

While the use of nitrosyl chloride from any source is contemplated, I prefer to use that obtained in the reaction between nitrogen peroxide and an alkali metal chloride, and particularly to the gaseous products resulting from the conversion of potassium chloride into potassium nitrate by the reaction of nitrogen peroxide, preferably in the form of gases containing oxides of nitrogen obtained by the oxidation of ammonia in air or oxygen, with moist potassium chloride, whereby a solid potassium nitrate product and a gaseous product containing substantial amounts of nitrosyl chloride, with or without hydrogen chloride or nitrogen oxides or both, are formed. For example, the oxidation products of ammonia, using air as a source of oxygen contain 8 to 10% of $NO_2$, the balance being principally nitrogen, with or without an excess of oxygen and water vapor. When this mixture of gases is passed in reactive contact with crystalline potassium chloride, the latter is substantially quantitatively converted into potassium nitrate and the chlorine content of the salt is practically quantitatively converted into nitrosyl chloride.

Example 4

The gaseous reaction products (NOCl, with or without HCl, NO or $NO_2$) from the reaction of nitrogen oxide and potassium chloride are led into and through a bed of humidified, granular phosphate rock in a manner analogous to that described above, resulting in the production of solid monocalcium phosphate and calcium chloride and of gaseous oxides of nitrogen. It will be apparent that $NO_2$ so produced may react, at least in part, with the phosphate rock to form monocalcium phosphate and calcium nitrate. As an alternative thereto, instead of a solid reaction product to be discharged, a liquid product may be obtained by maintaining a graduated aqueous flow downward through the said bed against an upward flow of reactive gases, to yield a concentrated solution of calcium chloride and phosphoric acid, and this solution may be reacted with a suitable quantity of phosphate rock to produce monocalcium phosphate. The products thus obtained, consisting principally of solid monocalcium phosphate and calcium chloride, are then heated as described above.

The gases emitted from the phosphate bed, now NO (together with the residual $N_2$, $CO_2$, etc. and any unreacted $NO_2$) are intermixed with air as a source of $O_2$ for the oxidation of the NO to $NO_2$ and are then passed into reactive contact with a second bed of humidified phosphate rock for the commercially complete absorption of the $NO_2$, and to yield calcium nitrate and monocalcium phosphate or phosphoric acid. In this case also, if the product contains phosphoric acid, it may be converted to monocalcium phosphate by reaction with phosphate rock as above described.

The heating of the monocalcium phosphate products may be carried out under varying conditions as described above to form products of varying degrees of basicity and to effect varying degrees of removal of the respective chloride and nitrate constituents thereof. In general, however, I prefer to conduct these heating operations at such temperature as to convert the phosphate largely or substantially wholly to a form containing calcium and phosphate in substantially the proportion of dicalcium phosphate, when allowance is made for calcium remaining combined with chloride or nitrate, respectively. Temperatures in the neighborhood of 150° C. have been found suitable for this purpose.

This application is a continuation-in-part of my applications Serial No. 5881, filed February 9, 1935 and Serial No. 102,196, filed September 23, 1936, now Patent 2,134,013 and 2,170,843, respectively.

I claim:

1. A phosphatic product consisting predominantly of a compound composed of calcium and phosphate radicals and a radical of the group consisting of chloride and nitrate, in proportion substantially equivalent to equimolecular proportions of dicalcium phosphate and at least one salt of the group consisting of calcium chloride and calcium nitrate, and exhibiting a solubility in water of its phosphate component substantially greater than that of dicalcium phosphate and being substantially less hygroscopic than a mixture of dicalcium phosphate and calcium chloride or calcium nitrate in the same ratio.

2. A phosphatic product consisting predominantly of a compound composed of calcium, phosphate and chloride radicals in proportion substantially equivalent to equimolecular proportions of dicalcium phosphate and calcium chloride, and exhibiting a solubility in water of its phosphate component substantially greater than that of dicalcium phosphate and being substantially less hygroscopic than a mixture of dicalcium phosphate and calcium chloride in the same ratio.

3. A phosphatic product consisting predominantly of a compound composed of calcium, phosphate and nitrate radicals in proportion substantially equivalent to equimolecular proportions of dicalcium phosphate and calcium nitrate, and exhibiting a solubility in water of its phosphate component substantially greater than that of dicalcium phosphate and being substantially less hygroscopic than a mixture of dicalcium phosphate and calcium nitrate in the same ratio.

JOHN W. TURRENTINE.